US012210823B2

(12) United States Patent
Jerger

(10) Patent No.: US 12,210,823 B2
(45) Date of Patent: Jan. 28, 2025

(54) TOGGLING THE DISPLAY OF RICH CONTENT WITHIN A DIGITAL DOCUMENT

(71) Applicant: Dropbox, Inc., San Francisco, CA (US)

(72) Inventor: Emily Jerger, Canoga Park, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/316,689

(22) Filed: May 12, 2023

(65) Prior Publication Data

US 2024/0378379 A1 Nov. 14, 2024

(51) Int. Cl.
*G06F 3/04842* (2022.01)
*G06F 40/106* (2020.01)
*G06F 40/166* (2020.01)
*G06F 40/197* (2020.01)

(52) U.S. Cl.
CPC ........ *G06F 40/197* (2020.01); *G06F 3/04842* (2013.01); *G06F 40/106* (2020.01); *G06F 40/166* (2020.01); *G06F 2203/04805* (2013.01)

(58) Field of Classification Search
CPC .... G06F 40/197; G06F 40/166; G06F 40/106; G06F 3/04842; G06F 2203/04805
See application file for complete search history.

(56) References Cited

U.S. PATENT DOCUMENTS 7,950,032 B1 * 5/2011 Lynch .................. H04N 21/454 348/460
8,060,357 B2 11/2011 Segond et al.
11,436,357 B2 * 9/2022 VanBlon ............... G06F 21/604
2003/0018668 A1 * 1/2003 Britton .................. G06F 40/169 715/230
2004/0049598 A1 * 3/2004 Tucker .................. H04L 67/564 707/E17.119
2004/0090462 A1 * 5/2004 Graham .................. G06F 16/40 715/767
2006/0041538 A1 2/2006 King et al.
2008/0111822 A1 * 5/2008 Horowitz ........... H04N 21/4622 345/530

(Continued)

OTHER PUBLICATIONS

Davmixcool/Chrome-Image-Hider, Sep. 30, 2018, pp. 1-14 (https://github.com/davmixcool/Chrome-Image-Hider) (Year: 2018).*

(Continued)

*Primary Examiner* — Scott T Baderman
*Assistant Examiner* — Mario M Velez-Lopez
(74) *Attorney, Agent, or Firm* — Keller Preece PLLC

(57) ABSTRACT

The present disclosure relates to systems, non-transitory computer-readable media, and methods for controlling the display of rich digital content within a digital document. For instance, in some embodiments, the rich content toggling system provides a rich content toggle element for enabling and disabling display of rich content within a digital document, all while maintaining the data for the rich content as part of the digital document. In addition to the rich content toggle element, the rich content toggling system can provide more granular options for selecting or controlling which types of rich content items to display or not display within a digital document. In addition, the disclosed systems can provide a magnifier cursor that is moveable to scroll over the digital document to reveal hidden or removed rich content items that have been toggled off.

20 Claims, 11 Drawing Sheets

(56) References Cited

U.S. PATENT DOCUMENTS

| | | | | |
|---|---|---|---|---|
| 2009/0083761 | A1* | 3/2009 | Mully | H04L 51/063 |
| | | | | 719/314 |
| 2010/0278453 | A1 | 11/2010 | King | |
| 2011/0029504 | A1 | 2/2011 | King et al. | |
| 2013/0339847 | A1* | 12/2013 | Bartek | G06Q 10/10 |
| | | | | 715/255 |
| 2014/0006660 | A1* | 1/2014 | Frei | H04L 43/10 |
| | | | | 710/104 |
| 2014/0072944 | A1* | 3/2014 | Robertson | G09B 5/02 |
| | | | | 434/430 |
| 2015/0033149 | A1* | 1/2015 | Kuchoor | H04N 21/4782 |
| | | | | 715/753 |
| 2015/0310188 | A1* | 10/2015 | Ford | H04L 63/101 |
| | | | | 726/28 |
| 2015/0370772 | A1 | 12/2015 | Wang et al. | |
| 2017/0041296 | A1* | 2/2017 | Ford | G06F 21/64 |
| 2017/0262490 | A1* | 9/2017 | Tholfsen | G06F 40/117 |
| 2019/0147020 | A1* | 5/2019 | Arav | G06Q 10/107 |
| | | | | 709/204 |
| 2019/0294652 | A1* | 9/2019 | Kang | G06F 40/10 |
| 2021/0049193 | A1 | 2/2021 | Lisa et al. | |
| 2021/0182430 | A1* | 6/2021 | Negi | G06F 21/6263 |
| 2022/0132179 | A1* | 4/2022 | Bennett-James | G06V 10/70 |
| 2022/0300598 | A1* | 9/2022 | Ford | G06F 21/31 |
| 2023/0074946 | A1* | 3/2023 | Wetherall | G06F 3/0482 |

OTHER PUBLICATIONS

Image Hider for Google Chrome extension, Feb. 9, 2023, pp. 1-2 (https://image-hider.en.softonic.com/chrome/extension) (Year: 2023).*

Hide Images/videos Chrome Web Store, Dec. 20, 2021, pp. 1 (https://chrome.google.com/webstore/detail/hide-imagesvideos/idmcpoiccfmffdglijpiapgienjemppo) (Year: 2021).*

Display hidden text in a circle following the mouse cursor, Jul. 27, 2020 pp. 1-5 https://stackoverflow.com/questions/63113310/display-hidden-text-in-a-circle-following-the-mouse-cursor/63113529#63113529 (Year: 2020).*

Simple Help: How to Disable Aminated .GIFs in Chrome or Edge as available Jul. 7, 2022, pp. 1-5 https://web.archive.org/web/20220707135902/https://www.simplehelp.net/2011/08/04/how-to-disable-animated-gifs-in-google-chrome/ (Year: 2022).*

Image Hider by Alex Mason (Chrome extension), Oct. 28, 2020, pp. 1-2 [https ://web.archive.org/web/20201028044749/http://alexmason81. github.io/ChromeImgHider/] (Year: 2020).*

* cited by examiner

TOGGLING THE DISPLAY OF RICH CONTENT WITHIN A DIGITAL DOCUMENT

BACKGROUND

Recent years have seen significant improvements in computer hardware and software platforms for generating, modifying, and sharing digital content items across a variety of content types. For example, the proliferation of computing devices and expanding network capabilities worldwide has led to widespread generation and dissemination of digital documents that contain both rich (e.g., images, formatted text, links, etc.) and non-rich (e.g., plain text) content. Despite these advances, however, existing systems often suffer from technological shortcomings that result in a number of deficiencies particularly in regard to flexible and functional operation.

As just suggested, some existing digital content systems are inflexible. For example, existing content delivery systems often adhere to particular content presentation schemes that are rigidly structured according to the devices, platforms, and/or computer languages implemented for generating and/or displaying digital documents. In some cases, the rigid nature of existing presentation schemes results in errors or broken content when providing a digital document for display, especially in cases where a recipient device is not compatible with a particular type of rich content included within the digital document, due to device constraints, network constraints, and/or other factors.

Along these lines, existing systems can sometimes generate and distribute a digital document having an unchangeable format that is not adaptive to limitations of recipient client devices. As a result, less capable or less compatible recipient devices of such rigidly formatted digital documents either cannot display the digital document at all or can only display broken fragments of document content. Indeed, without more adaptive recipient control of content presentation in digital documents, existing systems often lose or break portions of digital documents when sharing across devices.

In the case of collaborative digital documents, where multiple devices or user accounts are accessing or editing a collaborative digital document simultaneously, existing systems often display the collaborative digital document uniformly on all client devices. Indeed, the rigid nature of many existing systems prevents them from adapting presentation of a digital document independently on a per-recipient-device basis. Even for systems that can modify the appearance of a digital document to accommodate different platforms or device types (e.g., mobile and desktop versions), these existing systems nevertheless often require all recipient devices to display the same rich contents of a collaborative digital document.

These, along with additional problems and issues, exist with regard to existing systems.

SUMMARY

One or more embodiments described herein provide benefits and/or solve one or more problems in the art with systems, methods, and non-transitory computer readable storage media that generate and provide rich content control mechanisms for managing presentation of rich content within digital documents. For instance, the disclosed systems provide intuitive options for toggling display of (all or some of the) rich content within a digital document. Indeed, the disclosed systems can provide a toggle option for removing or disabling presentation of rich content, such as text formatting, images, embedded videos, and links, within a digital document at a recipient device. In some cases, the disclosed systems can provide a magnifier cursor that reveals hidden or disabled rich content when it is scrolled over portions of a digital document where presentation of rich content is disabled. In certain embodiments, the disclosed systems can disable presentation of rich content by either modifying presentation of a digital document at the user interface level or by modifying the digital document to remove or otherwise disable the rich content.

For example, the disclosed systems can provide a digital document that includes rich content. In response to a user interaction with a rich content toggle element, the disclosed systems can disable the display of a rich content item within the digital document. Indeed, the disclosed systems can modify the display of the rich content item to hide, or remove, the rich content items from display while still maintaining the rich content items as part of the digital document. Furthermore, the disclosed systems can receive input to move a magnifier cursor over an area of the digital document where the removed, or hidden, rich content item is located to reveal the removed rich content item. In addition, the disclosed systems can provide a notification indicating the presence (and location) of removed rich content and/or can provide a summary of the removed rich content (e.g., in place of the removed rich content).

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
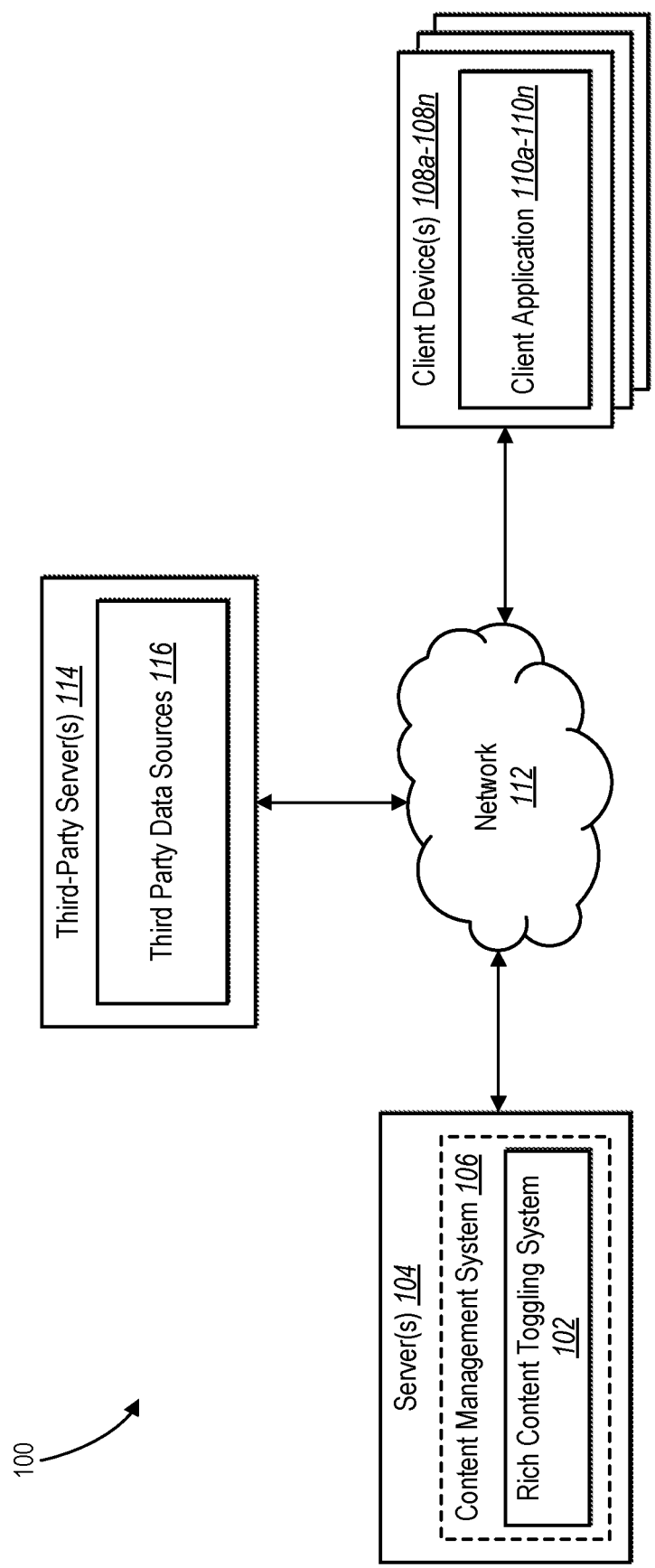
FIG. 1 illustrates an example environment within which a rich content toggling system can operate in accordance with one or more embodiments.

This disclosure describes embodiments of a rich content toggling system that controls the display of rich digital content within a digital document. For instance, in some embodiments, the rich content toggling system provides a rich content toggle element for enabling and disabling display of rich content within a digital document, all while maintaining the data for the rich content as part of the digital document. In addition to the rich content toggle element, the rich content toggling system can provide more granular options for selecting or controlling which (types of) rich content items to display or not display within a digital document. In addition, the disclosed systems can provide a magnifier cursor that is moveable to scroll over the digital document to reveal hidden or removed rich content items that have been toggled off.

As just mentioned, in one or more embodiments, the rich content toggling system provides a selectable option for toggling presentation or display of rich content within a digital document. In some cases, the rich content toggling system facilitates selecting which (types of) rich content items (e.g., images, links, or comments) of a digital document to toggle off. Thus, the rich content toggling system can remove a subset of rich content items from display within the digital document while maintaining display of other rich content items. In some embodiments, the rich content toggling system can remove one or more rich content items from display within the digital document without actually modifying the underlying data of the rich content items within the digital document.

In one or more embodiments, the rich content toggling system can provide additional selectable options to accompany a rich content toggle element for selecting additional toggling factors, such as interface elements for: toggling based on times when rich content items were added or modified (or were otherwise interacted with) in a digital document, toggling based on which user account added or modified (or otherwise interacted with) which rich content item, and/or toggling based on the topic or subject matter of rich content items.

In addition, the rich content toggling system can provide additional options or tools associated with toggling display of rich content items. For example, in response to toggling off presentation of a rich content item, the rich content toggling system can provide a visible indication that the rich content item has been removed from display. Moreover, in one or more embodiments, the rich content toggling system can generate a summary for a rich content item (e.g., by utilizing external or internal summary generation models) and can provide a text summary for display within the digital document in place of a summarized rich content item (e.g., to present the entire digital document in plain text).

As mentioned, in one or more embodiments, the rich content toggling system provides a magnifier cursor for revealing removed rich content items. For example, the rich content toggling system provides a magnifier cursor as a specialized interactive cursor tool that is moveable to scroll over places within a digital document where hidden or removed rich content items are located. Based on scrolling over a hidden rich content item, the rich content toggling system can reveal the item within the area of the magnifier cursor and can re-hide the content item when the cursor is moved away from the location (no longer hovering over the rich content item).

Embodiments of the rich content toggling system can provide many technological advantages and benefits over existing systems and methods. For example, the rich content toggling system can improve flexibility and functionality relative to existing systems. Specifically, in one or more embodiments, the rich content toggling system improves flexibility by adapting the presentation or display of rich content within a digital document at the recipient-device level. Indeed, the rich content toggling system can provide selectable options (e.g., a rich content toggle element) for flexibly adapting the presentation of rich content for different devices and platforms. By providing options to intelligently remove rich content items from display within a digital document, the rich content toggling system can circumvent the issues of prior systems that cause digital documents to be displayed incorrectly (e.g., with broken links, mangled formatting, fragmented content) and/or with lost or missing content.

In the case of collaborative digital documents, the rich content toggling system can flexibly customize the display of a collaborative digital document on a per-recipient-device basis. To illustrate, the rich content toggling system can provide rich content toggling elements (and other interface elements for interacting with rich content) on each collaborating device to facilitate device-specific control of presentation of rich content within a collaborative digital document. Accordingly, the rich content toggling system enables recipient devices to display only relevant or selected rich content items, customized specific to user accounts, rather than displaying the entire contents of a digital document in a one-size-fits all manner.

As an additional advantage, in one or more embodiments, the rich content toggling system provides a more efficient user interface than those available in existing systems. Specifically, the rich content toggling system provides a rich content toggle element within a user interface that facilitates single-input control of presenting rich content within a digital document. By introducing this functional improvement to user interfaces displaying digital documents, the rich content toggling system can reduce the amount of user interactions required to remove rich content. Indeed, as opposed to prior systems that require many inputs for item-by-item interaction to control the display of rich content, the rich content toggling system requires far fewer inputs (e.g., a single input) with a rich content toggle element to control presentation of all (or some) of the rich content in a digital document.

As illustrated by the foregoing discussion, the present disclosure utilizes a variety of terms to describe features and benefits of the rich content toggling system. Additional detail is now provided regarding the meaning of these terms. In particular, as used herein the term "digital document" refers to a computer file or electronic media content that contains text and/or rich content in an electronic format. Digital documents can be stored, shared, and accessed electronically, and can include various file formats such as PDF, DOC, XLS, and TXT. Similarly, as used herein the term "collaborative digital document" refers to a digital document that is accessible simultaneously, synchronously, or contemporaneously by multiple user accounts. A collaborative digital document can be accessed using a variety of tools and platforms, such as shared online document editors, project management software, or communication tools that allow user accounts to coordinate in real-time or asynchronously. DROPBOX PAPER is an example of a collaborative digital document that allows multiple users to work on the same document simultaneously, providing a seamless collaborative experience.

Similarly, as used herein the term "content management system" refers to a software application system that can be used to create, facilitate, access, and/or manage digital documents across one or more computer networks. In particular, a content management system can provide a centralized platform for managing and organizing digital content, while also facilitating digital document management across user accounts. For example, DROPBOX is a content management system that provides many digital content management functions, including file synchronization across devices and between user accounts, real-time editing, commenting, version control, and task assignment.

As used herein, the term "rich content item" (or "rich content") refers to a digital media element or a content item that is interpretable by a computing device to present information as more than plain text. In particular, a rich content item can include a modification to plain text (e.g., text formatting) and/or additional digital media content that is embedded or incorporated within a digital document for presentation or display within the digital document. For example, rich content items can include a variety of digital content types, such as hyperlinks, images, videos, infographics, interactive quizzes and polls, interactive graphics, audio files, animations, comments, notes, highlighting, formatting, chatbots, accessibility features, and other visual aids.

Relatedly, as used herein, the term "rich content toggle element" refers to a user interface element that is selectable to toggle between displaying or removing rich content from display within a digital document on a client device. In particular, the rich content toggle element provides a single-input element for switching, or toggling, between rich and non-rich states of a digital document, without the need for complex menus or settings that require further interaction.

Additionally, as used herein, the term "rich content functionality" refers to engagement features provided by rich content to supplement simple static text or images. In particular, rich content functionality facilitates, or results from, user interaction with a rich content item, such as participation in a virtual meeting via selection of a meeting link, viewing of a video, highlighting of a digital image, or navigation to a website via selection of a link or button to access additional content. For example, rich content functionality can include the auto-play of an animated gif, a video, a voiceover, or the activation of a hyperlink to open a website in a browser.

Furthermore, as used herein, a "text summary" is a brief and condensed text description of one or more rich content items in a digital document. In particular, a text summary can include a description (e.g., in sentence form) of an embedded video, an image, or a website associated with a link inserted with a digital document. For example, a text summary of an image of a playbill can include a description of the contents of the playbill and/or information relevant to the date and time of the related play.

Further, as used herein, a "summary generation model" refers to a machine learning model that generates a text summary. For example, a summary generation model generates a plain text description of one or more rich content items. A summary generation model can include a machine learning model and/or a natural language processing (NLP) algorithm. In particular, during training, the summary generation model is presented with input of rich content and a corresponding output summary. The model then uses statistical techniques to identify patterns in the rich content, such as correlations between certain rich content and the likely rich content context or meaning and the model gradually adjusts its parameters to better predict the output based on the input. This prediction can be made by using a probabilistic approach, where the model generates a set of possible summaries and selects the most likely summary based on the probability of each response. In some cases, a summary generation model refers to a large language model (e.g., ChatGPT) or a vision-language model that processes rich content items to generate a text summary.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional or deconvolutional neural networks that include various blocks, layers, components, and/or elements. In addition, a neural network is an algorithm (or set of algorithms) that implements deep learning techniques that utilize a set of algorithms to model high-level abstractions in data.

Additionally, as used herein, a "magnifier cursor" refers to a software tool within a user interface that is interactive and moveable for revealing hidden or removed rich content in an area of a digital document underlaying the magnifier cursor. When the magnifier cursor is activated, an area (the size and shape of the magnified area can be adjusted based on user need) is modified to display the details of the rich content at that location (e.g., rich content that has been removed from display). In one or more embodiments, the magnifier cursor can allow the user account to interact with the revealed rich content items.

Additional detail regarding the rich content toggling system will now be provided with reference to the figures. For example, FIG. 1 illustrates a schematic diagram of an exemplary system environment ("environment") 100 in which a rich content toggling system 102 can be implemented. An overview of the rich content toggling system 102 is described in relation to FIG. 1. Thereafter, a more detailed description of the components and the processes of the rich content toggling system 102 is provided in relation to the subsequent figures.

As shown, the environment includes server(s) 104 and client device(s) 108a-108n. The client device(s) 108a-108n can be one of a variety of computing devices, including a smartphone, a tablet, a smart television, a desktop computer, a laptop computer, a virtual reality device, an augmented reality device, or another computing device as described in relation to FIGS. 6-7. The client device(s) 108a-108n can communicate with the server(s) 104 and or third-party server(s) 114 via the network 112. For example, the client device(s) 108a-108n can receive user input from respective users interacting with the client device(s) 108a-108n (e.g., via the content management system 106) to, for instance, access, or modify, and/or add or remove rich content items from display (e.g., via the rich content toggling system 102). In addition, the rich content toggling system 102 on the server(s) 104 can receive information relating to various interactions with content and/or user interface elements based on the input received by the client device(s) 108a-108n (e.g., to remove rich content items from display).

As shown, the client device(s) 108a-108n can include a client application 110a-110n. In particular, the client application 110a-110n may be a native application installed on the client device(s) 108a-108n (e.g., a mobile application, a desktop application, etc.), or a cloud-based or web application where all or part of the functionality is performed by the server(s) 104. Based on instructions from the content management system 106, the client device(s) 108a-108n can present or display information, via the client application 110a-110n, including user interfaces that include depictions of digital documents.

As illustrated in FIG. 1, the example environment also includes the server(s) 104. The server(s) 104 may generate, track, store, process, receive, and transmit electronic data, such as digital documents, interactions with digital documents, and/or interactions between user accounts or client devices. For example, the server(s) 104 may receive data from the client device(s) 108a-108n in the form of a request to generate a rich content item, interact with a rich content item, or display/remove a rich content item for a digital document on the client device(s) 108a-108n. Indeed, the server(s) 104 can communicate with the client device(s) 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning servers, and other types of servers.

As shown in FIG. 1, the server(s) 104 can also include the rich content toggling system 102 as part of a content management system 106. The content management system 106 can communicate with the client device(s) 108a-108n to perform various functions associated with the content management system 106 such as managing digital documents, managing rich content, managing rich content collection, managing user accounts, and facilitating user interaction with digital documents. The content management system 106 can communicate with the third-party server(s) 114 to perform various functions associated with the rich content toggling system 102 such as identifying and collecting third-party data for the rich content items. Indeed, the content management system 106 can include a network-based cloud storage system to manage, store, and maintain rich content items and related data across numerous user accounts.

As shown in FIG. 1, the third-party server(s) 114 can include third party data sources 116. In some embodiments, the rich content toggling system 102 and/or the content management system 106 access the third-party server(s) 114 to access and obtain information from third party data sources 116 such as digital documents, rich content attributes, rich content links, and other information. In some embodiments, the rich content toggling system 102 and/or the content management system 106 access the client device(s) 108a-108n to access and obtain information from third party data sources 116 such as digital documents, rich content attributes, and other information.

Although FIG. 1 depicts the rich content toggling system 102 located on the server(s) 104, in some implementations, the rich content toggling system 102 may be implemented by one or more components of the environment (e.g., located entirely or in part). For example, the rich content toggling system 102 may be implemented by the client device(s) 108a-108n, and/or a third-party device. For example, the client device(s) 108a-108n can download all or part of the rich content toggling system 102 for implementation independent of, or together with, the server(s) 104.

In some implementations, though not illustrated in FIG. 1, the environment may have a different arrangement of components and/or may have a different number or set of components altogether. For example, the client device(s) 108a-108n may communicate directly with the rich content toggling system 102, bypassing the network 112. As another example, the environment may include multiple client devices, each associated with a different user account for managing digital documents.

Figure 2:
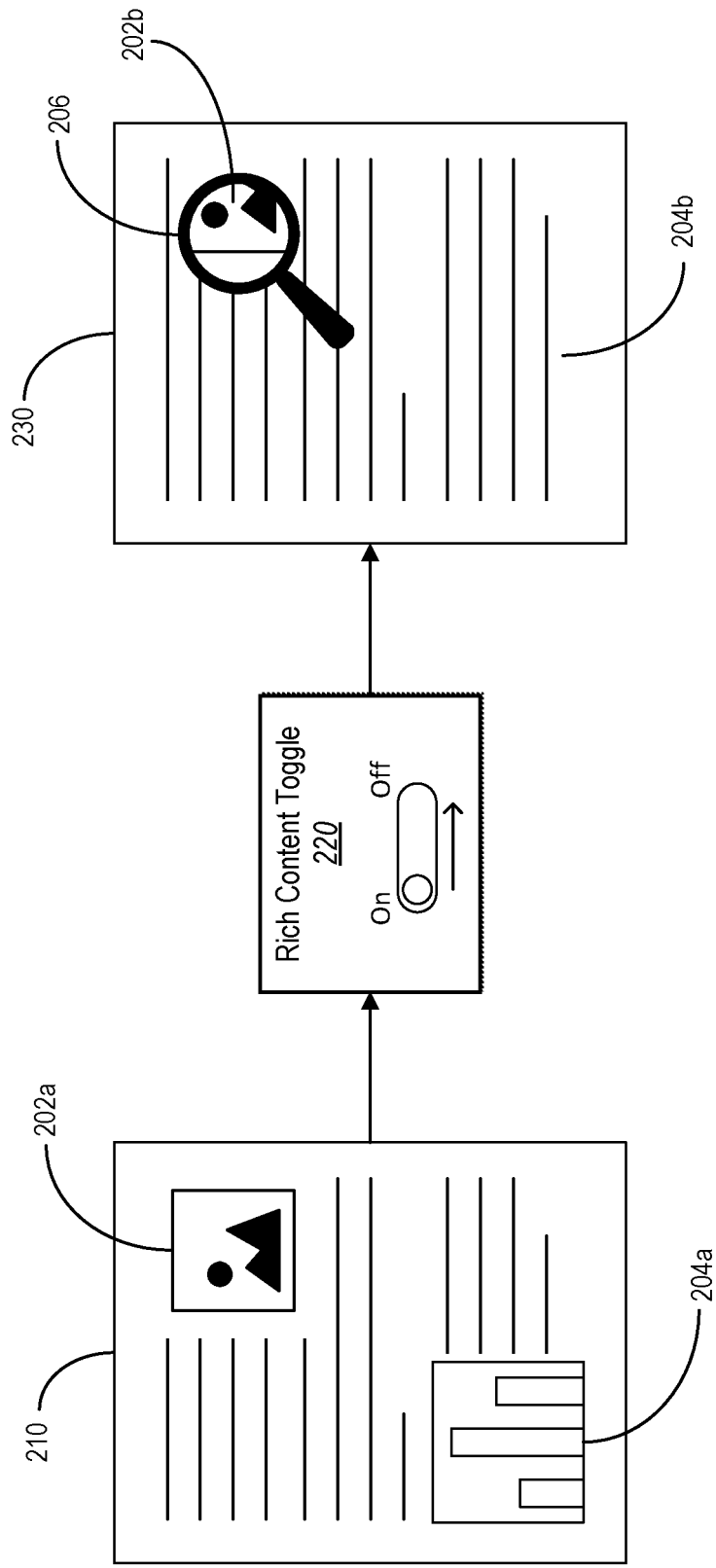
FIG. 2 illustrates an example of a rich content toggling system in accordance with one or more embodiments.

As mentioned above, the rich content toggling system 102 can flexibly modify the display of rich content (e.g., on/off) for a digital document. FIG. 2 illustrates an overview of accessing a digital document, receiving an indication to modify the display of rich content within the digital document, and altering the display of rich content within the digital document in accordance with one or more embodiments. Additional detail regarding the various parts of FIG. 2 is provided thereafter with reference to subsequent figures.

As illustrated in FIG. 2, the rich content toggling system 102 identifies a digital document 210 that contains one or more rich content items. In particular, the digital document 210 can contain rich content items that can include digital images, videos, hyperlinks, cross-references, embedded media, calendar data, webpages, digital messages, phone application data, collaborative content, content formatting, and/or rich content items of other types. In some embodiments, the rich content toggling system 102 accesses rich content that includes content stored in one or more network locations associated with third party data sources 116 (e.g., websites, digital files, digital images, audio files, digital documents). As shown, the digital document 210 contains and displays rich content items that include an image 202a and an interactive element 204a.

As further illustrated in FIG. 2, the rich content toggling system 102 receives an indication of a user interaction selecting a rich content toggle element 220 to toggle off the display or functionality of one or more rich content items within the digital document. In particular, the rich content toggling system 102 receives an indication to switch between two or more display states of the rich content item (e.g., an on state, an off state, and/or a partial state where some rich contents are removed from display while others remain). For example, the user interaction with a rich content toggle element could involve clicking on a specific link or button, selecting a menu option, or otherwise engaging with the digital document in a way that leads to modifying the display state of one or more rich content items.

Furthermore, the rich content toggling system 102 displays the digital document 230 with the rich content removed from the display (e.g., by modifying the display of the digital document 210 at the user interface level and/or by modifying the digital document 210 itself). As shown, the rich content toggling system 102 removes the rich content items that include the image 202a and the interactive element 204a from display within the digital document 210 to display the digital document 230 (e.g., a plain text version of the digital document 210). In particular, as shown, the digital document 230 displays the digital document 230 with the interactive element 204a removed from location 204b.

As mentioned, the rich content toggling system 102 can generate a textual summary for the interactive element 204a (and/or image 202a) and can display the textual summary at location 204b—a location where the interactive element 204a was removed from display—(and/or at the location of image 202a) or at another location within the document. Additionally, the rich content toggling system 102 can display or present a visual indicator (e.g., textual content) such as a plain text symbol at location 204b (and/or at the location of image 202a), or at another location within the document, that signifies that interactive element 204a (and/or image 202a) has been removed from display.

As further shown, the rich content toggling system 102 includes a magnifier cursor 206 that provides a rich content bubble for viewing rich content of the digital document. In one or more embodiments, the rich content toggling system 102 enables or initiates the magnifier cursor 206 based on a client device interaction activating the rich content toggle element 220. In one or more embodiments, the rich content toggling system 102 enables the magnifier cursor 206 based on a user selection of a magnifier cursor element. As shown, based on a user interaction to scroll over a removed rich content item using the magnifier cursor 206, the rich content toggling system 102 displays or reveals pixels of the rich content item that were removed or hidden from display (in response to the user interaction selecting the rich content toggle element 220) within the digital document.

For example, when the magnifier cursor 206 is positioned near or hovering over the location of the document where the image 202a is located (e.g., hidden from display) within the digital document 230, the rich content toggling system 102 reveals pixels of the image 202b (e.g., for a portion of the image 202a corresponding to the position, area, or display window of the magnifier cursor 206). Indeed, in some embodiments, when the image 202a is removed from display (e.g., the presentation of the image 202a is disabled), and the image 202a is no longer visible or accessible, the rich content toggling system 102 can nevertheless maintain the image 202a within the digital document for viewing using the magnifier cursor 206.

Figure 3:
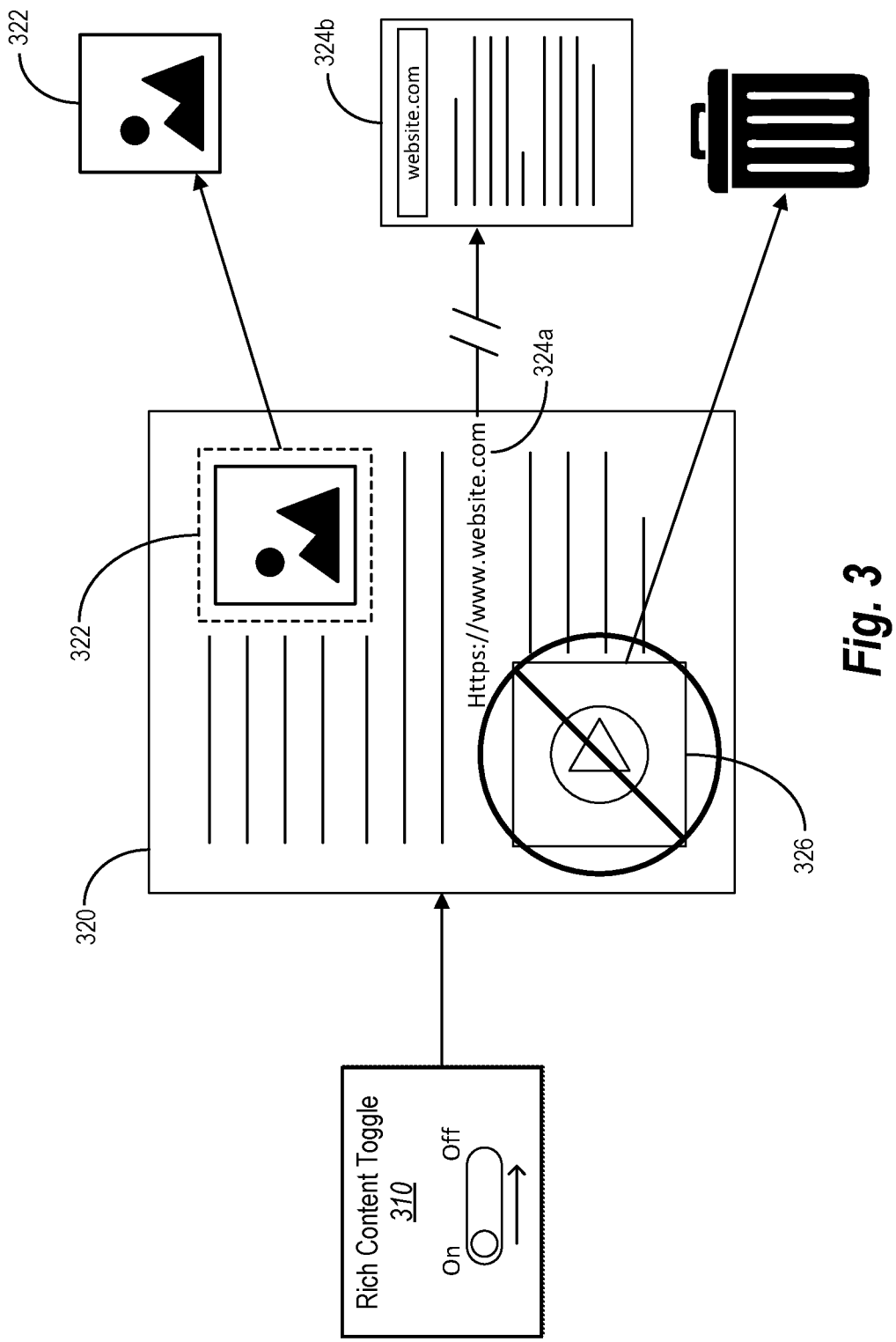
FIG. 3 illustrates a diagram illustrating toggling the display of rich content within a digital document in accordance with one or more embodiments.

As mentioned, in one or more embodiments, the rich content toggling system 102 coordinates displaying and removing rich content items from display. For example, the rich content toggling system 102 can remove rich content from display, remove rich content functionality, and/or remove rich content from the digital document. FIG. 3 illustrates variations of toggling the display of rich content within a digital document in accordance with one or more embodiments.

As illustrated in FIG. 3, the rich content toggling system 102 can receive an indication of a user interaction selecting a rich content toggle element 310 to toggle off rich content items within a digital document 320. In particular, based on an interaction with the rich content toggle element 310, the rich content toggling system 102 can remove rich content from display, remove rich content functionality, and/or remove rich content within the digital document. For example, the rich content toggling system 102 can remove pixels of the image 322 from a portion of the user interface displaying the digital document 320. As shown, the rich content toggling system 102 maintains the data associated with image 322 within the digital document 320, but removes or filters pixels for image 322 at the user interface level.

As further illustrated, the rich content toggling system 102 can utilize a rich content toggle element 310 receive an indication to toggle off the functionality of rich content items within a digital document 320. For example, based on an interaction with the rich content toggle element 310, the rich content toggling system 102 can remove the functionality of the hyperlink 324a from the digital document 320. As shown, the rich content toggling system 102 can continue to display the text address (e.g., in plain text) for the hyperlink while removing the interactive functionality which generates the display of the website 324b when a user interacts with the hyperlink 324a. In one or more embodiments, removing the functionality of rich content can include removing the rich content portions of a content item from display (e.g., where a content item includes both rich and non-rich content portions or elements).

Further, the rich content toggling system 102 can utilize a rich content toggle element 310 to receive an indication to remove rich content items from a digital document 320. For example, based on an interaction with the rich content toggle element 310, the rich content toggling system 102 can remove (or delete) the interactive content item 326 from the digital document 320 (e.g., including the underlying data for the interactive content item 326 within the data for the digital document 320). When removing the interactive content item 326, the rich content toggling system 102 can create a new document without the rich content item (and maintain the original document with the interactive content item 326) and/or remove the interactive content item 326 from the digital document 320. Indeed, in this manner, the rich content toggling system 102 can create a digital document that does not contain rich content items.

In one or more embodiments, the rich content toggling system 102 can utilize and modify metadata to manage the display of rich content items as described above. For example, the rich content toggling system 102 can store metadata defining features of one or more rich content items within the digital document, such as content type, creation date, modification date, author, description, size, location, and/or pointer data that references additional server locations for other content items. To illustrate, the rich content toggling system 102 can remove rich content items from display based on metadata showing a content type of "user comment" and an author of "User A." To illustrate, metadata can be used to indicate the removal of a particular rich content item from display within a digital document and the replacement of the rich content item with a text summary.

As mentioned, the rich content toggling system 102 toggles the display of rich content within a digital document. In particular, FIGS. 4A-4E illustrate an example of a rich content toggling system 102 graphical user interface 402a and the user device 400 interaction with a digital document 410 in accordance with one or more embodiments.

Figure 4A:
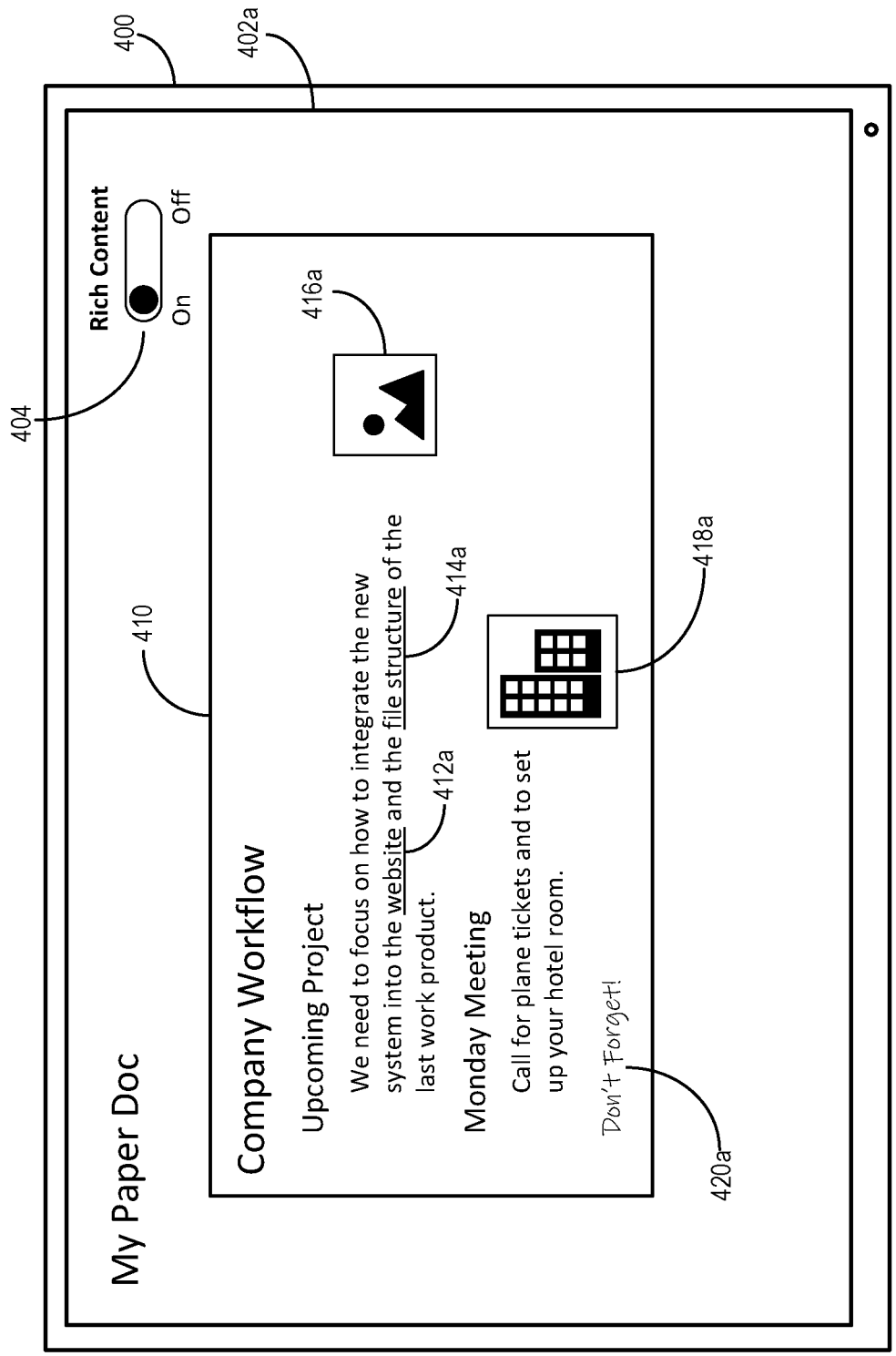
FIGS. 4A-4E illustrate an example rich content toggling system graphical user interface and user device interaction with a digital document in accordance with one or more embodiments.

As shown in FIG. 4A, the rich content toggling system 102 displays a graphical representation of the digital document 410 with rich content displayed. The rich content toggling system 102 provides a visible indication of the rich content status within the digital document 410. For example, in FIG. 4A, the rich content toggle element 404 is in the "on" position signifying that the rich content toggling system 102 displays the rich content within the digital document 410. As shown, the rich content toggling system 102 displays rich content comprising a website hyperlink 412a, a data storage link 414a, a digital image 416a, a fillable form 418a, and a user comment 420a. Notably, the rich content toggling system 102 displays the rich content consistent (e.g., coordinated) with the text in the digital document.

Figure 4B:
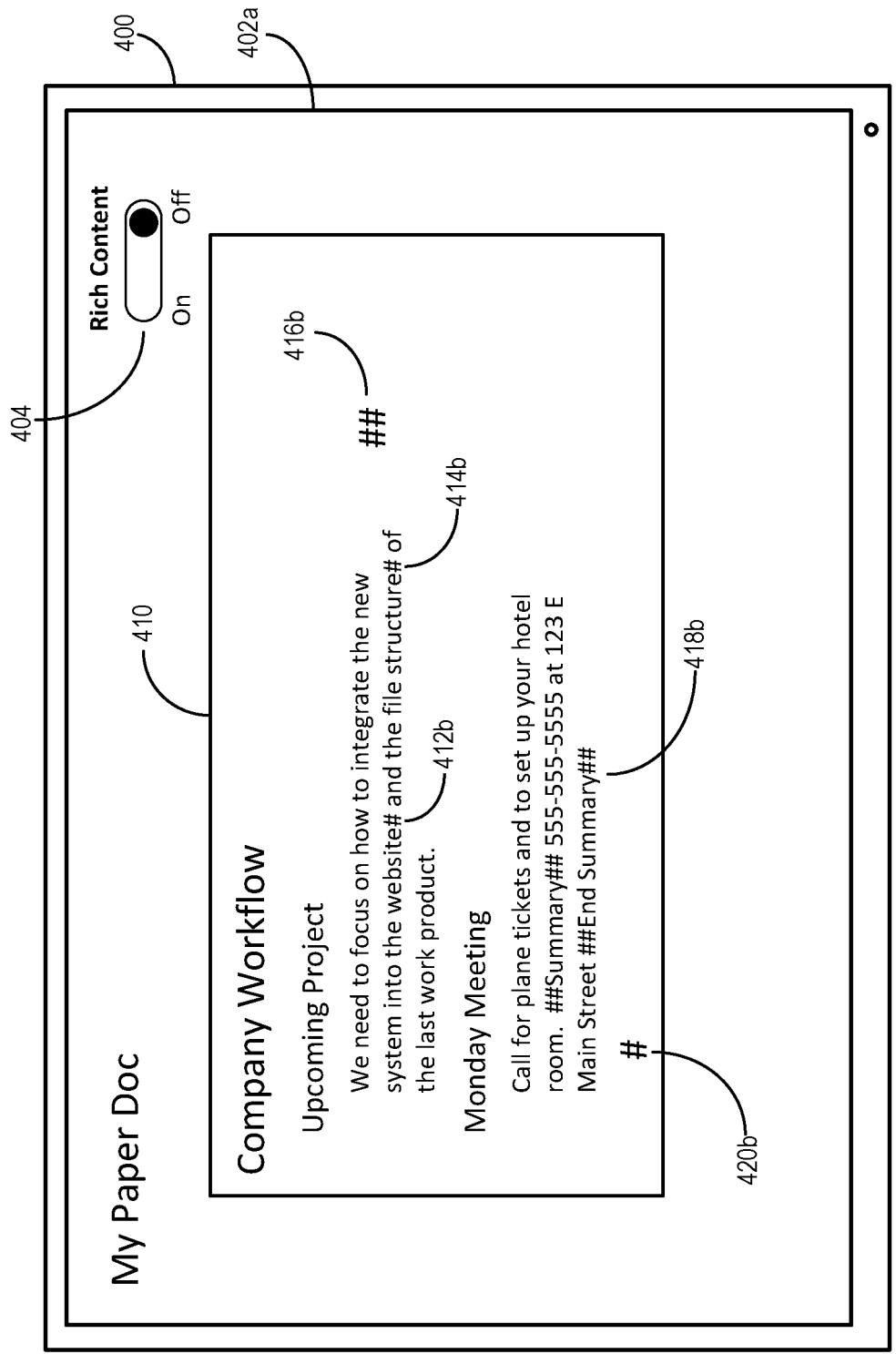

As further shown in FIG. 4B, based upon the selection to toggle off the rich content items, the rich content toggling system 102 displays a graphical representation of the digital document 410 with rich content removed. The rich content toggling system 102 provides a visible indication of the rich content status within the digital document 410. For example, the rich content toggle element 404 is in the "off" position signifying that the rich content toggling system 102 removed the rich content from display within the digital document 410. As shown, the rich content toggling system 102 removes the rich content comprising a website hyperlink 412a, a data storage link 414a, a digital image 416a, a fillable form 418a, and a user comment 420a (from FIG. 4A) and replaces the rich content with text/symbol 412b, text/symbol 414b, symbols 416b, symbol 420b, and text summary 418b, respectively.

Notably, the rich content toggling system 102 can replace the rich content with an indication or a notification that the rich content has been removed from the digital document 410. For example, as shown in FIG. 4B, the rich content toggling system 102 can utilize a symbol of "#" (or some other plain text notification such as "—rich content removed here—") to indicate that rich content has been removed from the digital document (e.g., as shown for the website hyperlink 412a, the data storage link 414a, and the user comment 420a). As further shown, the rich content toggling system 102 can utilize different symbols to show that different types of rich content have been removed from the digital document (e.g., as shown by "##" for removing the digital image 416a), where each symbol corresponds to a respective rich content type.

Additionally, the rich content toggling system 102 can replace removed rich content with a text summary that includes a plain text description of the removed rich content item and/or can display a visual indication that the summary has been added (e.g., ##Summary ## and ##End Summary ##). For example, as shown, the rich content toggling system 102 replaces the fillable form 418a (from FIG. 4A) with a text summary 418 that includes the phone number and address of the hotel pictured/linked in the fillable form 418a. Notably, in some embodiments, the rich content toggling system 102 can remove the rich content without replacing the rich content within the digital document or providing a visual indication that the content has been removed from the document.

Additionally, the rich content toggling system 102 can provide additional editing features within the digital document. In particular, when the rich content is disabled as shown in FIG. 4B, the rich content toggling system 102 can provide a notification, or warning, to a user account when hidden rich content is being edited (e.g., when the user cannot see the rich content item they are editing because it has been removed from display). For example, if a user attempts to edit the digital document 410 and modify/delete the text including "into the website #," the rich content toggling system 102 can provide a warning that the user is attempting to modify/delete a hidden rich content item.

As mentioned, in some embodiments the rich content toggling system 102 can generate a text summary for removed rich content items utilizing a summary generation model (e.g., dependency classification model, a natural language processing model, and/or a neural network). The rich content toggling system can train the summary generation model by providing selected rich content items and corresponding output summaries. The model can use statistical techniques to identify patterns in the rich content, such as correlations between certain rich content and the likely rich content context or meaning and the model gradually adjusts its parameters to better predict the output based on the input. This prediction can be made by using a probabilistic approach, where the model generates a set of possible summaries and selects the most likely summary based on the probability of each response. In some cases, a summary generation model can include a large language model (e.g., ChatGPT) or a vision-language model that process rich content items to generate a text summary.

Figure 4C:
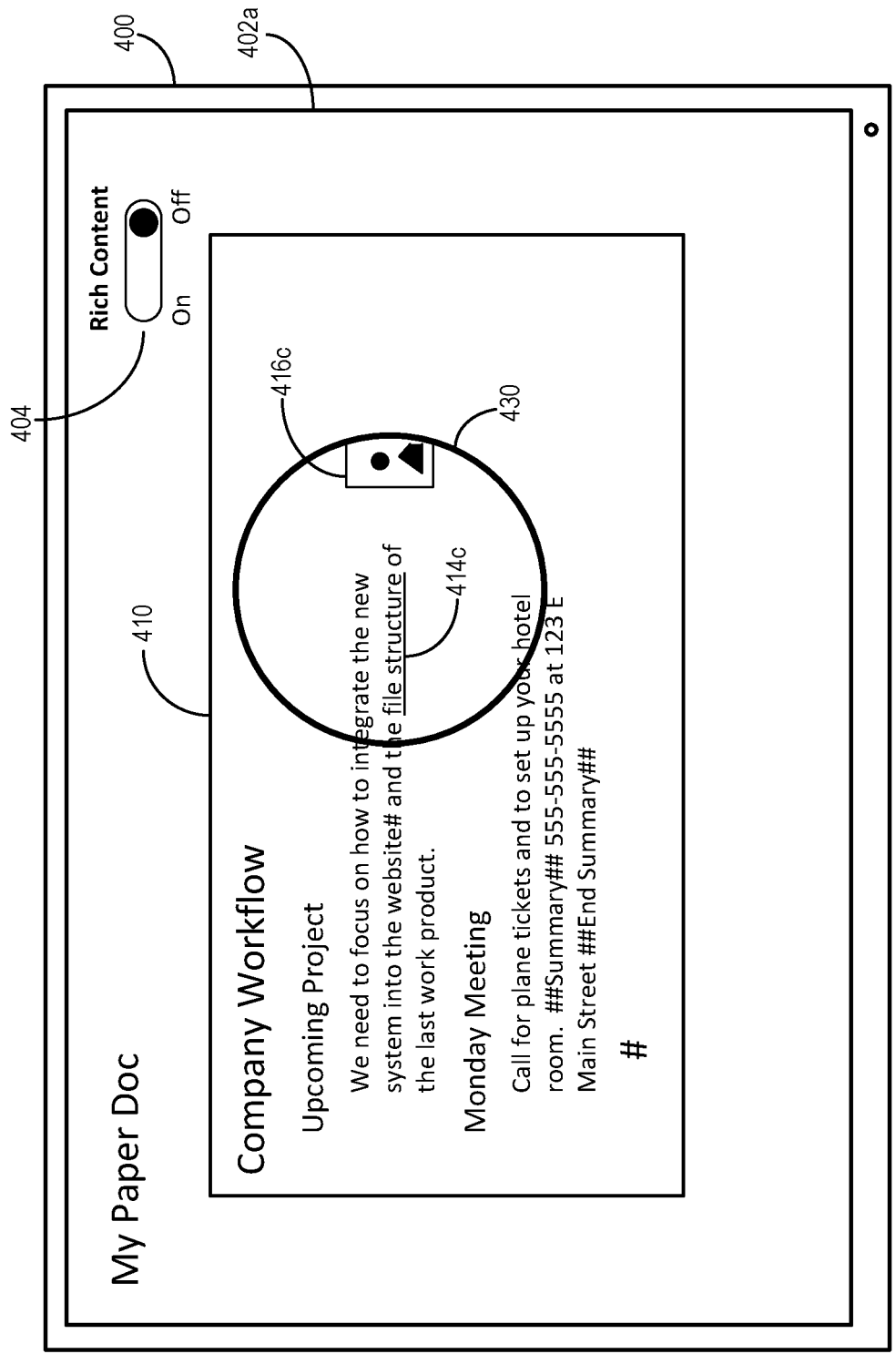

As mentioned, the rich content toggling system 102 can provide a magnifier cursor within a user interface that is interactive and moveable for revealing hidden or removed rich content in an area of the digital document 410 underlaying the magnifier cursor 430. As shown in FIG. 4C, the rich content toggling system 102 provides a magnifier cursor 430 that reveals hidden rich content in a circular area (the size and shape of the magnified area can be adjusted based on user input and/or automatically based on document size and/or based on device type/screen size). Indeed, as shown in FIG. 4C, the digital document 410 reveals the hidden details of the data storage link 414c and/or pixels of portions of the digital image 416c that underlay the area of the magnifier cursor 430 (e.g., data storage link 414a and part of digital image 416a that have been removed from display). As further shown, the rich content toggling system 102 displays areas outside the magnifier cursor 430 display within the digital document 410 without the rich content.

In some embodiments, the rich content toggling system 102 can reverse the function of the magnifier cursor 430 to provide a rich content bubble for viewing the digital document 410 with rich content removed. For example, based on a user interaction to scroll over a visible rich content item using the magnifier cursor 430 when the rich content toggle element 404 is set to "on," the rich content toggling system 102 can hide, or remove from display, rich content of the digital document 410 underlaying an area of the magnifier cursor 430, while presenting the digital document with visible rich content in other areas. Additionally, in one or more embodiments, the rich content toggling system 102 provides a magnifier cursor 430 that, when positioned over removed rich content, displays additional information about the removed rich content, such as a text summary or a linked website (or other content item) to further/related information (e.g., viewable only within the magnifier cursor 430).

In one or more embodiments, the magnifier cursor can allow the user account to interact with revealed rich content items. In particular, the rich content toggling system 102 can provide the functionality of the revealed rich content items to the user account when the magnifier cursor 430 overlaying the revealed rich content items. For example, in FIG. 4C, the rich content toggling system 102 can provide the functionality of the data storage link 414c by activating the data storage link 414c based on a user interaction with the data storage link 414c within the area of the magnifier cursor 430.

Figure 4D:
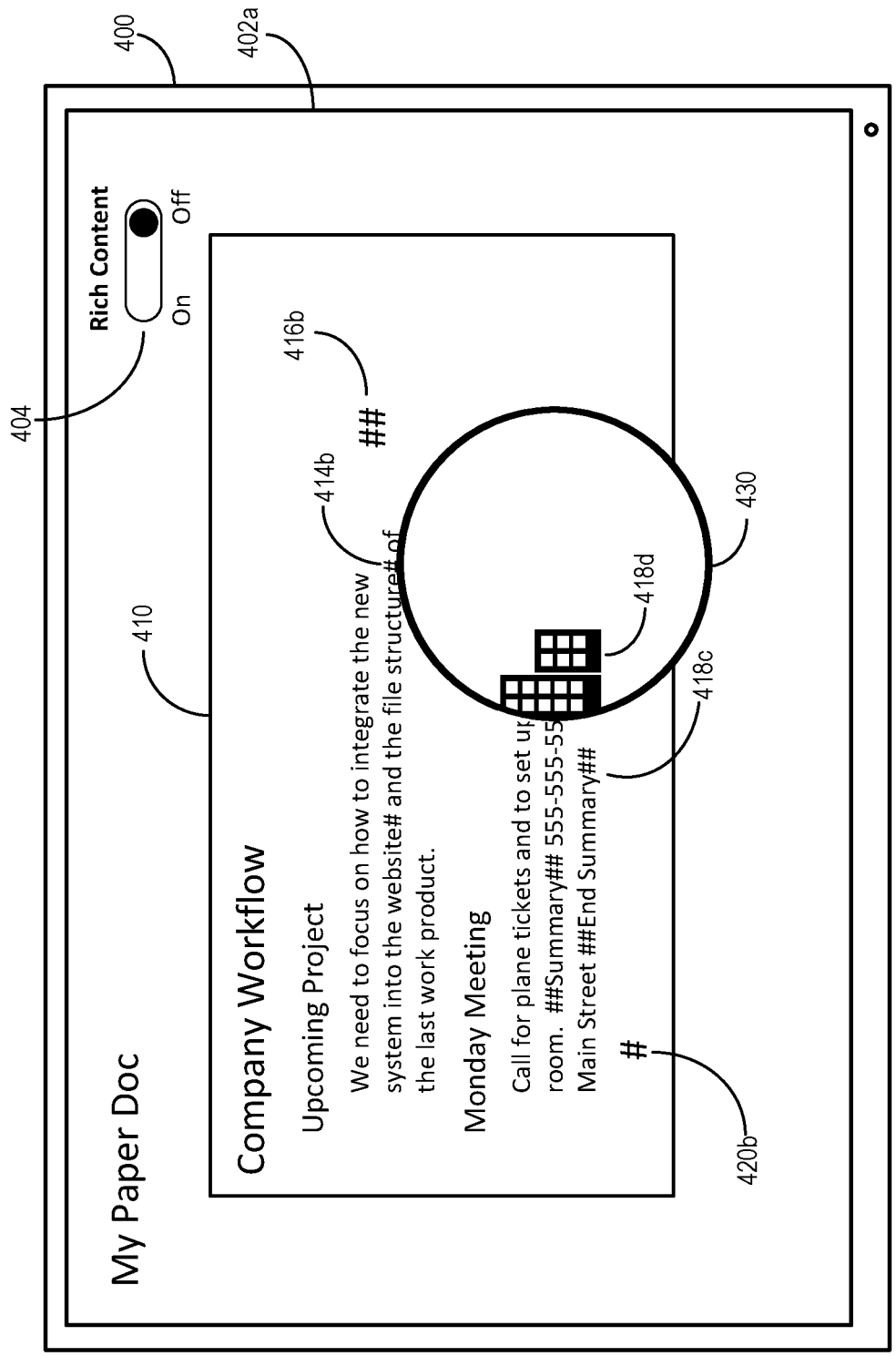

As mentioned and further shown in FIG. 4D, the rich content toggling system 102 can display one or more rich content items based on the location of the magnifier cursor 430. For example, in FIG. 4D, the magnifier cursor 430 is shown in a new location and the rich content toggling system 102 reveals hidden rich content in a circular area that includes fillable form 418d. As shown, the rich content toggling system 102 can display a portion of the fillable form 418a (shown as fillable form 418d) when the magnifier cursor 430 is positioned near the location of fillable form 418a. As further shown, the rich content toggling system 102 can continue to display all or part of the text summary 418b (shown as text summary 418c). Notably, in one or more embodiments, the rich content toggling system 102 can display the entire fillable form 418a when the magnifier cursor 430 is positioned at or near the location of fillable form 418a and/or remove the text summary from display.

Figure 4E:
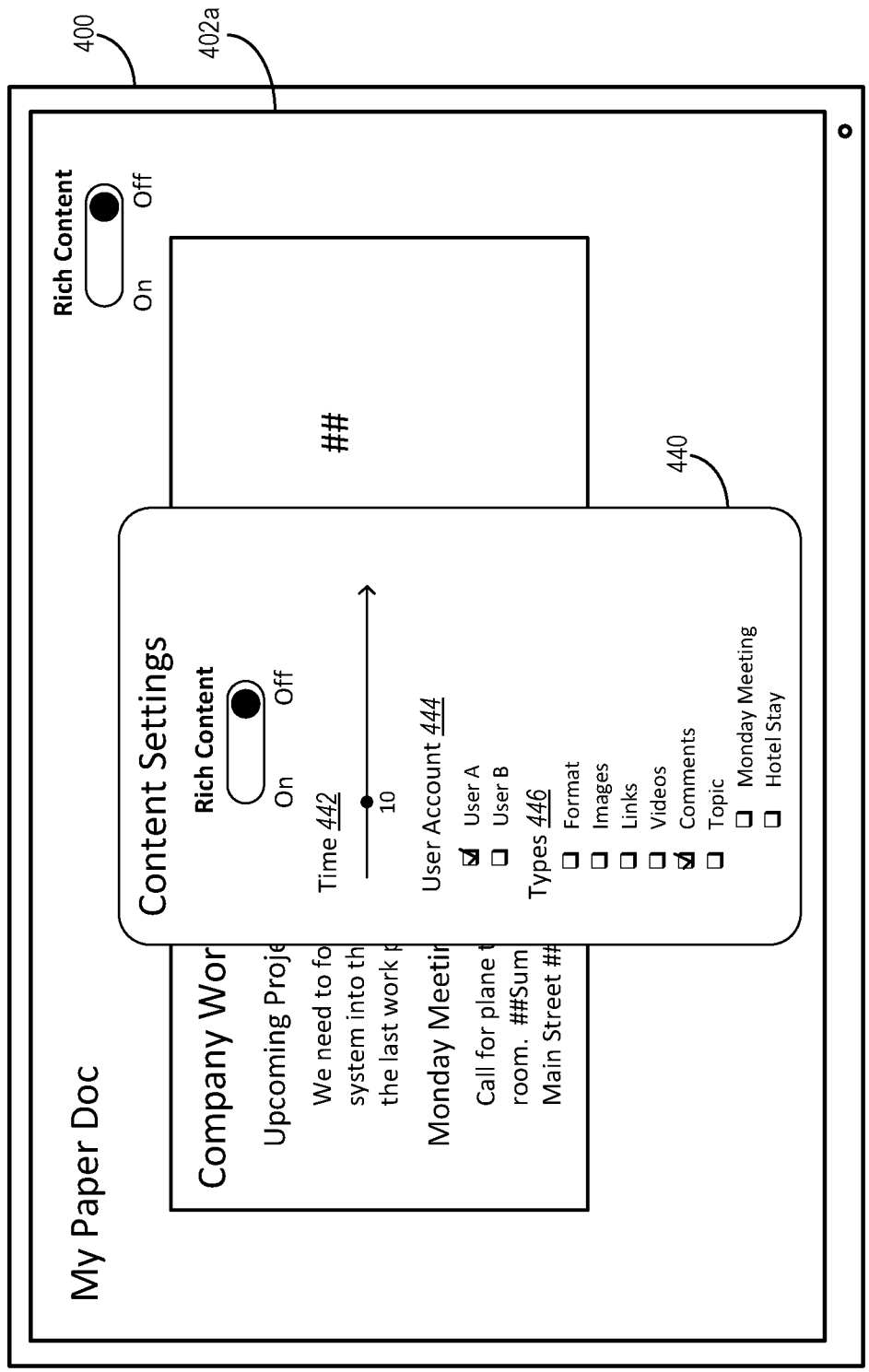

As further shown in FIG. 4E, the rich content toggling system 102 can provide granular options 440 for selecting which rich content items to display or not display (and enable/remove) within a digital document. Indeed, the rich content toggling system 102 can display (and enable/remove) rich content based on a combination of one or more granular selections. In particular, the rich content toggling system 102 can display rich content items based on an associated time 442, associated date range, and/or associated time window. For example, as shown, the rich content toggling system 102 can display rich content that has been added (or modified) within a threshold time period (e.g., the last 10 minutes). In some cases, the rich content toggling system 102 can also display the rich content based on content added (or modified) within a specified time window, content added before a specified time, and/or content added in the current session. To illustrate, the rich content toggling system 102 can toggle off expired comments and/or comments that were created or added outside a threshold recency (e.g., to only keep comments made within the threshold recency, such as within the hour or within the last day).

Additionally, the rich content toggling system 102 can hide or display rich content associated with a particular user account. For example, the rich content toggling system 102 can provide an option 444 to display rich content that is associated with User A and/or User B. In particular, the rich content toggling system 102 can display rich content that a specified user account (e.g., User A) adds, modifies, controls, owns, views, and/or deletes. For example, the rich content toggling system 102 can toggle off comments added by a particular user account while displaying the comments added by other user accounts within the digital document 410. To illustrate, as shown on FIG. 4E, the rich content toggling system 102 can toggle off comments created by User A prior to the last 10 minutes and leave the other rich content displayed within the digital document 410 (including all comments made by User B and the comments made by User A within the last 10 minutes).

Further, the rich content toggling system 102 can display rich content of specified types. As shown in FIG. 4E, the rich content toggling system 102 can display or not display rich content within the document based on specific content types 446 such as a format, images, links, videos, comments, and/or topics. For example, the rich content toggling system 102 can display or not display rich content within the document based on rich content format. For example, the rich content toggling system 102 can display or not display rich content within the document based on formatting such as fonts, highlighting, bold, underlining, bullets, lists, tables, headings, text styles, footnotes, headers, watermarks, columns, and/or borders.

Furthermore, the rich content toggling system 102 can display or not display rich content within the document based on topics within the digital document. For example, the rich content toggling system 102 may evaluate content from within the digital document to determine relationships between some, or all, of the content. To illustrate, the rich content toggling system 102 can determine one or more topics associated with rich content in the digital document (e.g., based on a machine learning model, a neural network, metadata, and/or rich content tags), receive a selection to remove rich content associated with a topic from display, and remove the rich content associated with the topic from display.

Additionally, in some cases, the rich content toggling system 102 can enable or disable the functionality of the rich content (e.g., image, link, comment, or video) by removing the ability of the user to interact with the rich content yet still display the rich content within the document. To illustrate, the rich content toggling system 102 can provide additional security within a digital document by disabling the ability for the user to click on a hyperlinks to external sources. To illustrate, the rich content toggling system 102 can disable rich content functionality by disabling the auto-play of an animated gif, video, or voiceover, or the activation of a survey.

FIGS. 1-4E, the corresponding text, and the examples provide a number of different systems and methods for controlling the display of rich digital content within a digital document. In addition to the foregoing, implementations can also be described in terms of flowcharts comprising acts/steps in a method for accomplishing a particular result. For example, FIG. 5 illustrates an example series of acts for toggling the display of rich content within a digital document in accordance with one or more embodiments.

Figure 5:
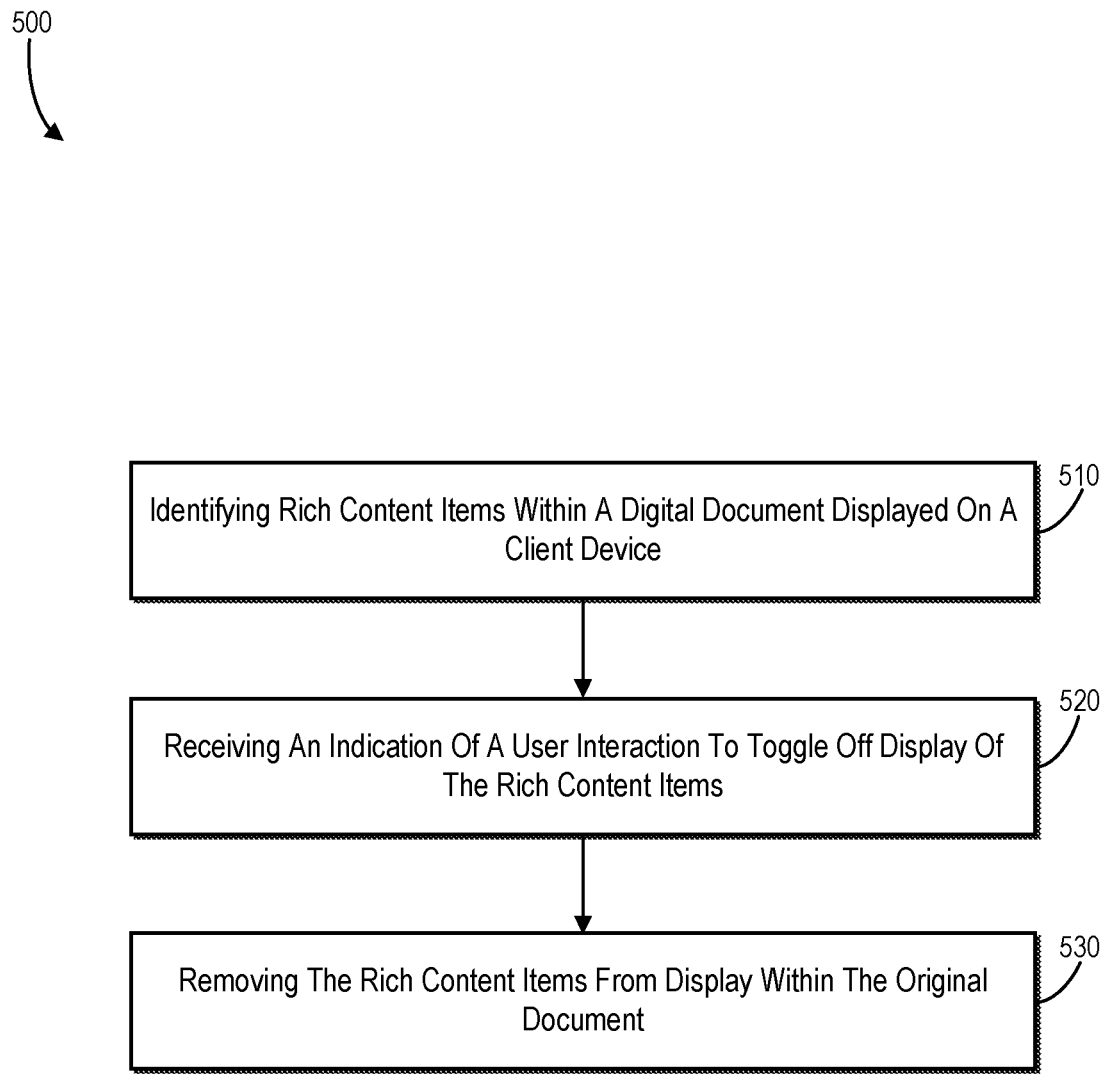
FIG. 5 illustrates a flowchart of a series of acts for toggling the display of rich content within a digital document in accordance with one or more embodiments.

As illustrated in FIG. 5, the series of acts 500 may include an act 510 of identifying rich content items within a digital document displayed on a client device. For example, in one or more embodiments, the act 510 can include identifying one or more rich content items within a digital document displayed on a client device. In addition, the series of acts 500 includes an act 520 of receiving an indication of a user interaction to toggle off display of the rich content items. For example, in one or more embodiments, the act 520 can include receiving, from the client device, an indication of a user interaction selecting a rich content toggle element for toggling off display of the one or more rich content items within the digital document. As further illustrated in FIG. 5, the series of acts 500 includes an act 530 of removing the rich content items from display within the original document. In one or more embodiments, as described above, the act 530 can include based on the user interaction, removing the one or more rich content items from display within the digital document on the client device.

Further, in one or more embodiments, the series of acts 500 includes removing the one or more rich content items from display within the digital document by disabling presentation of the one or more rich content items within the digital document without modifying the digital document. In addition, in one or more embodiments, the series of acts 500 includes providing, for display on the client device, a rich content toggle element selectable to toggle presentation of a specific rich content type. Furthermore, in one or more embodiments, the series of acts 500 includes providing, for display on the client device, a rich content toggle element selectable to toggle presentation of a rich content item added to the digital document by a specific user account.

Additionally, in one or more embodiments, the series of acts 500 includes storing metadata defining the one or more rich content items within the digital document; and removing the one or more rich content items from display by modifying the metadata stored for defining the one or more rich content items. Moreover, in one or more embodiments, the series of acts 500 includes providing, for display on the client device, a magnifier cursor that provides a rich content bubble for viewing rich content of the digital document; and based on a user interaction to scroll over a removed rich content item using the magnifier cursor, displaying the removed rich content item that was removed from display within the digital document in response to the user interaction selecting the rich content toggle element. Further, in one or more embodiments, the series of acts 500 includes providing, for display on the client device, a visible indication of a rich content status indicating that rich content has been removed from display for at least a portion of the digital document.

Furthermore, in one or more embodiments, the series of acts 500 includes identifying one or more rich content items within a digital document displayed on a client device; receiving, from the client device, an indication of a user interaction selecting a rich content toggle element for toggling off display of the one or more rich content items within the digital document; and based on the user interaction, modifying a visual presentation of the digital document to remove the one or more rich content items from display on the client device.

Moreover, in one or more embodiments, the series of acts 500 includes generating, in response to the user interaction selecting the rich content toggle element, a text summary from the one or more rich content items removed from display within the digital document; and modifying, for display on the client device, the digital document by replacing the one or more rich content items with the text summary. Additionally, in one or more embodiments, the series of acts 500 includes identifying one or more rich content items within a collaborative digital document; and causing the system to remove the one or more rich content items from display within the collaborative digital document for a subset of user accounts with access to the collaborative digital document.

Moreover, in one or more embodiments, the series of acts 500 includes providing, for display on the client device, the rich content toggle element selectable to toggle presentation of a rich content item corresponding to a specific topic. Furthermore, in one or more embodiments, the series of acts 500 includes receiving, from the client device, an indication of a user interaction for a modification of the digital document at a location where a rich content item is present but not visible; and providing, for display on the client device, a notification that the modification affects the rich content item that is present at the location but not visible. Moreover, in one or more embodiments, the series of acts 500 includes providing, for display on the client device, a magnifier cursor that provides a rich content bubble for viewing rich content of the digital document; and based on a user interaction to scroll over a removed rich content item using the magnifier cursor, displaying the removed rich content item that was removed from display within the digital document in response to the user interaction selecting the rich content toggle element, wherein areas outside the magnifier cursor display the digital document without rich content. In addition, in one or more embodiments, the series of acts 500 cause the system to provide, for display on the client device, the rich content toggle element selectable to toggle presentation of a rich content item added to the digital document within a specified time window.

Furthermore, in one or more embodiments, the series of acts 500 includes identifying one or more rich content items within a digital document displayed on a client device; receiving, from the client device, an indication of a user interaction toggling off display of one or more rich content items within the digital document; and based on the user interaction, removing the one or more rich content items from display within the digital document on the client device.

Moreover, in one or more embodiments, the series of acts 500 includes removing the one or more rich content items from display within the digital document comprises disabling a functionality of the one or more rich content items within the digital document. Additionally, in one or more embodiments, the series of acts 500 includes identifying one or more rich content items within a collaborative digital document; and causing the system to remove the one or more rich content items from display within the collaborative digital document for all user accounts with access to the collaborative digital document. Further, in one or more embodiments, the series of acts 500 includes generating, using a summary generation model and in response to the user interaction toggling off display of one or more rich content items, a text summary from the one or more rich content items removed from display within the digital document; and modifying, for display on the client device, a text summary from the one or more rich content items removed from display within the digital document.

Further, in one or more embodiments, the series of acts 500 includes providing, for display on the client device, a magnifier cursor that provides a rich content bubble for viewing rich content of the digital document; and based on a user interaction to scroll over a removed rich content item using the magnifier cursor, displaying the removed rich content item that was removed from display within the digital document in response to the user interaction toggling off display of one or more rich content items. Additionally, in one or more embodiments, the series of acts 500 includes causing the computing device to provide a version of the digital document with the rich content removed from association with the digital document.

In one or more implementations, each of the components of the rich content toggling system 102 are in communication with one another using any suitable communication technologies. Additionally, the components of the rich content toggling system 102 can be in communication with one or more other devices including one or more client devices described above. It will be recognized that in as much the rich content toggling system 102 is shown to be separate in the above description, any of the subcomponents may be combined into fewer components, such as into a single component, or divided into more components as may serve a particular implementation.

Figure 6:
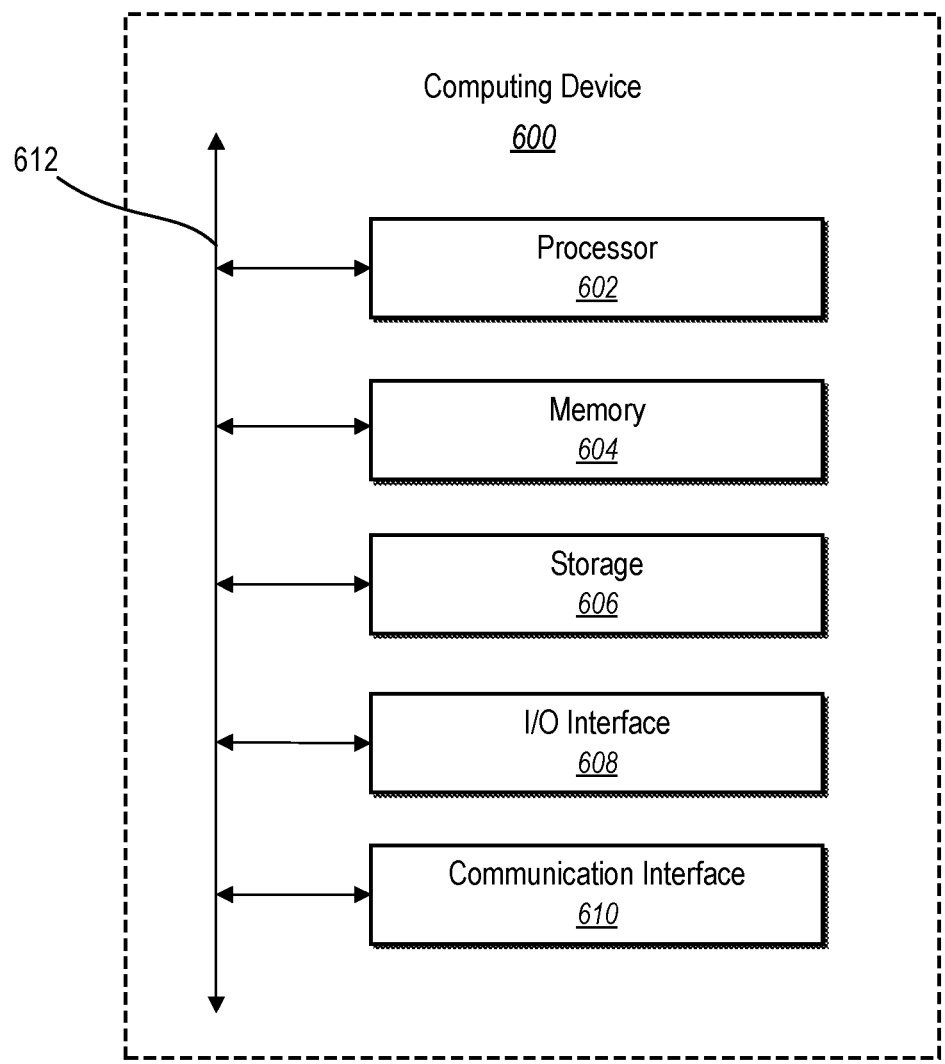
FIG. 6 illustrates a block diagram of an exemplary computing device in accordance with one or more embodiments.

FIG. 6 illustrates a block diagram of exemplary computing device 600 that may be configured to perform one or more of the processes described above. The components of the rich content toggling system 102 can include software, hardware, or both. For example, the components of the rich content toggling system 102 can include one or more instructions stored on a computer-readable storage medium and executable by processors of one or more computing devices (e.g., the computing device 600). When executed by the one or more processors, the computer-executable instructions of the rich content toggling system 102 can cause the computing device 600 to perform the methods described herein. Alternatively, the components of the rich content toggling system 102 can comprise hardware, such as a special purpose processing device to perform a certain function or group of functions. Additionally, or alternatively, the components of the rich content toggling system 102 can include a combination of computer-executable instructions and hardware.

Furthermore, the components of the rich content toggling system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the rich content toggling system 102 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 6 illustrates a block diagram of exemplary computing device 600 that may be configured to perform one or more of the processes described above. One will appreciate that server(s) 104, the client device(s) 108a-108n, and/or the computing device 600 may comprise one or more computing devices such as computing device 600. As shown by FIG. 6, computing device 600 can comprise processor 602, memory 604, a storage device, a I/O interface, and communication interface 610, which may be communicatively coupled by way of communication infrastructure 612. While an exemplary computing device 600 is shown in FIG. 6, the components illustrated in FIG. 6 are not intended to be limiting. Additional or alternative components may be used in other implementations. Furthermore, in certain implementations, computing device 600 can include fewer components than those shown in FIG. 6. Components of computing device 600 shown in FIG. 6 will now be described in additional detail.

In particular implementations, processor 602 includes hardware for executing instructions, such as those making up a computer program. As an example and not by way of limitation, to execute instructions, processor 602 may retrieve (or fetch) the instructions from an internal register, an internal cache, memory 604, or storage device 606 and decode and execute them. In particular implementations, processor 602 may include one or more internal caches for data, instructions, or addresses. As an example and not by way of limitation, processor 602 may include one or more instruction caches, one or more data caches, and one or more translation lookaside buffers (TLBs). Instructions in the instruction caches may be copies of instructions in memory 604 or storage device 606.

Memory 604 may be used for storing data, metadata, and programs for execution by the processor(s). Memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 604 may be internal or distributed memory.

Storage device 606 includes storage for storing data or instructions. As an example and not by way of limitation, storage device 606 can comprise a non-transitory storage medium described above. Storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to computing device 600. In particular implementations, storage device 606 is non-volatile, solid-state memory. In other implementations, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 608 allows a user to provide input to, receive output from, and otherwise transfer data to and receive data from computing device 600. I/O interface 608 may include a mouse, a keypad or a keyboard, a touch screen, a camera, an optical scanner, network interface, modem, other known I/O devices or a combination of such I/O interfaces. I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 608 is configured to provide graphical data to a display for presentation to a user. The graphical data may be representative of one or more graphical user interfaces and/or any other graphical content as may serve a particular implementation.

Communication interface 610 can include hardware, software, or both. In any event, communication interface 610 can provide one or more interfaces for communication (such as, for example, packet-based communication) between computing device 600 and one or more other computing devices or networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 612 may include hardware, software, or both that couples components of computing device 600 to each other. As an example and not by way of limitation, communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
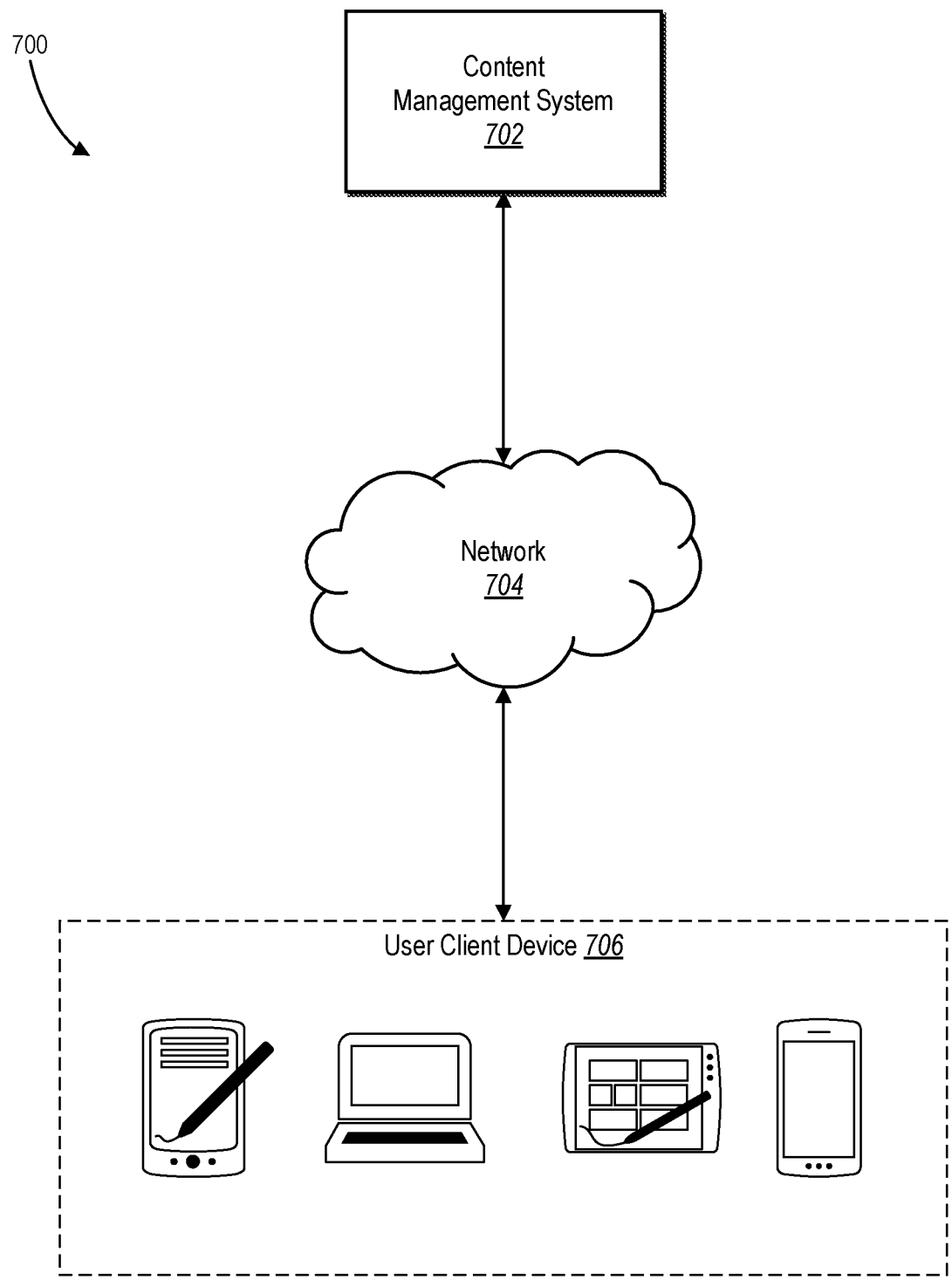
FIG. 7 illustrates a networking environment of a rich content toggling system in accordance with one or more embodiments.

FIG. 7 is a schematic diagram illustrating environment 700 within which one or more implementations of the rich content toggling system 102 can be implemented. As discussed above with respect to FIG. 1, in some embodiments the rich content toggling system can be part of a content management system. In such cases, the rich content toggling system can perform various functions a content management system performs, as described below. The content management system 702 may generate, store, manage, receive, and send digital content (such as digital videos). For example, content management system 702 may send and receive digital content to and from the user client device 706 by way of network 704. In particular, the content management system 702 can store and manage a collection of digital content. The content management system 702 can manage the sharing of digital content between computing devices associated with a plurality of users. For instance, the content management system 702 can facilitate a user sharing a digital content with another user of content management system 702.

In particular, the content management system 702 can manage synchronizing digital content across multiple user client devices 706 associated with one or more users. For example, a user may edit digital content using user client device 706. The content management system 702 can cause user client device 706 to send the edited digital content to content management system 702. Content management system 702 then synchronizes the edited digital content on one or more additional computing devices.

In addition to synchronizing digital content across multiple devices, one or more implementations of content management system 702 can provide an efficient storage option for users that have large collections of digital content. For example, content management system 702 can store a collection of digital content on content management system 702, while the user client device 706 only stores reduced-sized versions of the digital content. A user can navigate and browse the reduced-sized versions (e.g., a thumbnail of a digital image) of the digital content on user client device 706. In particular, one way in which a user can experience digital content is to browse the reduced-sized versions of the digital content on user client device 706.

Another way in which a user can experience digital content is to select a reduced-size version of digital content to request the full- or high-resolution version of digital content from content management system 702. In particular, upon a user selecting a reduced-sized version of digital content, user client device 706 sends a request to content management system 702 requesting the digital content associated with the reduced-sized version of the digital content. Content management system 702 can respond to the request by sending the digital content to user client device 706. User client device 706, upon receiving the digital content, can then present the digital content to the user. In this way, a user can have access to large collections of digital content while minimizing the amount of resources used on user client device 706.

User client device 706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 706 may access content management system 702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying one or more rich content items within a digital document displayed on a client device;
receiving, from the client device, an indication of a user interaction selecting a rich content toggle element for toggling off display of the one or more rich content items within the digital document;
based on the user interaction, removing one or more digital media elements from display within the digital document on the client device and replacing the display of the one or more digital media elements with one or more media element summaries comprising plain text descriptions of contents of the one or more digital media elements while maintaining the one or more digital media elements within the digital document;
based on an additional user interaction, scrolling a rich content bubble for viewing rich content of the digital document over a portion of a media element summary from among the one or more media element summaries, wherein the media element summary corresponds to a digital media element of the one or more digital media elements; and
based on the additional user interaction, replacing the portion of the media element summary overlapped by the rich content bubble and revealing a corresponding portion of the digital media element overlapped by the rich content bubble while retaining a remainder of the media element summary for display.

2. The computer-implemented method of claim 1, wherein removing the one or more rich content items from display within the digital document comprises disabling presentation of the one or more rich content items within the digital document without modifying the digital document.

3. The computer-implemented method of claim 1, further comprising providing, for display on the client device, the rich content toggle element selectable to toggle presentation of a specific rich content type.

4. The computer-implemented method of claim 1, further comprising providing, for display on the client device, the rich content toggle element selectable to toggle presentation of a rich content item added to the digital document by a specific user account.

5. The computer-implemented method of claim 1, further comprising:
storing metadata defining the one or more rich content items within the digital document; and
wherein removing the one or more rich content items from display comprises modifying the metadata stored for defining the one or more rich content items.

6. The computer-implemented method of claim 1, wherein:
removing the one or more digital media elements from display within the digital document on the client device comprises removing one or more of hyperlinks or videos from display within the digital document on the client device; and
partially revealing a portion of the digital media element overlapped by the rich content bubble comprises partially revealing a portion of one or more of the hyperlinks or the videos overlapped by the rich content bubble.

7. The computer-implemented method of claim 1, further comprising providing, for display on the client device, a visible indication of a rich content status indicating that rich content has been removed from display for at least a portion of the digital document.

8. A system comprising:
at least one processor; and
a non-transitory computer readable medium comprising instructions that, when executed by the at least one processor, cause the system to:
identify one or more rich content items within a digital document displayed on a client device;
receive, from the client device, an indication of a user interaction selecting a rich content toggle element for toggling off display of the one or more rich content items within the digital document;
based on the user interaction, modify a visual presentation of the digital document to remove one or more digital media elements from display on the client device and replace the display of the one or more digital media elements with one or more text media element summaries comprising plain text descriptions of contents of the one or more digital media elements while maintaining the one or more digital media elements within the digital document;
based on an additional user interaction, scroll a rich content bubble for viewing rich content of the digital document over a portion a media element summary from among the one or more media element summaries, wherein the media element summary corresponds to a digital media element of the one or more digital media elements; and
based on the additional user interaction, replacing the portion of the media element summary overlapped by the rich content bubble and reveal a corresponding portion of the digital media element overlapped by the rich content bubble while retaining a remainder of the media element summary for display.

9. The system of claim 8, further comprising instructions that, when executed by the at least one processor, cause the system to:
generate, in response to the user interaction selecting the rich content toggle element, a text summary from the one or more rich content items removed from display within the digital document; and
modify, for display on the client device, the digital document by replacing the one or more rich content items with the text summary.

10. The system of claim 8, wherein:
the digital document is a collaborative digital document; and
further comprising instructions that, when executed by the at least one processor, cause the system to remove the one or more rich content items from display within the collaborative digital document for a subset of user accounts with access to the collaborative digital document.

11. The system of claim 8, further comprising providing, for display on the client device, the rich content toggle element selectable to toggle presentation of a rich content item corresponding to a specific topic.

12. The system of claim 8, further comprising instructions that, when executed by the at least one processor, cause the system to:
receive, from the client device, an indication of a user interaction for a modification of the digital document at a location where a rich content item is present but not visible; and
provide, for display on the client device, a notification that the modification affects the rich content item that is present at the location but not visible.

13. The system of claim 8, wherein:
removing the one or more digital media elements from display within the digital document on the client device comprises removing one or more of animations or infographics from display within the digital document on the client device; and
partially revealing a portion of the digital media element overlapped by the rich content bubble comprises partially revealing a portion of one or more of the animations or the infographics overlapped by the rich content bubble.

14. The system of claim 8, further comprising instructions that, when executed by the at least one processor, cause the system to provide, for display on the client device, the rich content toggle element selectable to toggle presentation of a rich content item added to the digital document within a specified time window.

15. A non-transitory computer readable medium comprising instructions that, when executed by at least one processor, cause a computing device to:
identify one or more rich content items within a digital document displayed on a client device;
receive, from the client device, an indication of a user interaction toggling off display of one or more rich content items within the digital document;
based on the user interaction, remove one or more digital media elements from display within the digital document on the client device and replace the display of the one or more digital media elements with one or more media element summaries comprising plain text descriptions of contents of the one or more digital media elements while maintaining the one or more digital media elements within the digital document;
based on an additional user interaction, scroll a rich content bubble for viewing rich content of the digital document over a portion of a media element summary from among the one or more media element summaries, wherein the media element summary corresponds to a digital media element of the one or more digital media elements; and based on the additional user interaction, replacing the portion of the media element summary overlapped by the rich content bubble and revealing a corresponding portion of the digital media element overlapped by the rich content bubble while retaining a remainder of the media element summary for display.

16. The non-transitory computer readable medium of claim 15, wherein removing the one or more rich content items from display within the digital document comprises disabling a functionality of the one or more rich content items within the digital document.

17. The non-transitory computer readable medium of claim 15, wherein:
the digital document is a collaborative digital document; and
further comprising instructions that, when executed by at least one processor, cause the computing device to remove the one or more rich content items from display within the collaborative digital document for all user accounts with access to the collaborative digital document.

18. The non-transitory computer readable medium of claim 15, further comprising instructions that, when executed by the at least one processor, cause the computing device to:
generate, using a summary generation model and in response to the user interaction toggling off display of one or more rich content items, a text summary from the one or more rich content items removed from display within the digital document; and
modify, for display on the client device, a text summary from the one or more rich content items removed from display within the digital document.

19. The non-transitory computer readable medium of claim 15, wherein:
removing the one or more digital media elements from display within the digital document on the client device comprises removing one or more of images or formatting from display within the digital document on the client device; and
partially revealing a portion of the digital media element overlapped by the rich content bubble comprises partially revealing a portion of one or more of the images or the formatting overlapped by the rich content bubble.

20. The non-transitory computer readable medium of claim 15, further comprising instructions that, when executed by the at least one processor, cause the computing device to provide a version of the digital document with the one or more rich content items removed from association with the digital document.

* * * * *